Dec. 10, 1929.　　　　B. S. SNOW　　　　1,739,099
MATERIAL MOVING APPARATUS
Filed Nov. 1, 1926　　　5 Sheets-Sheet 1
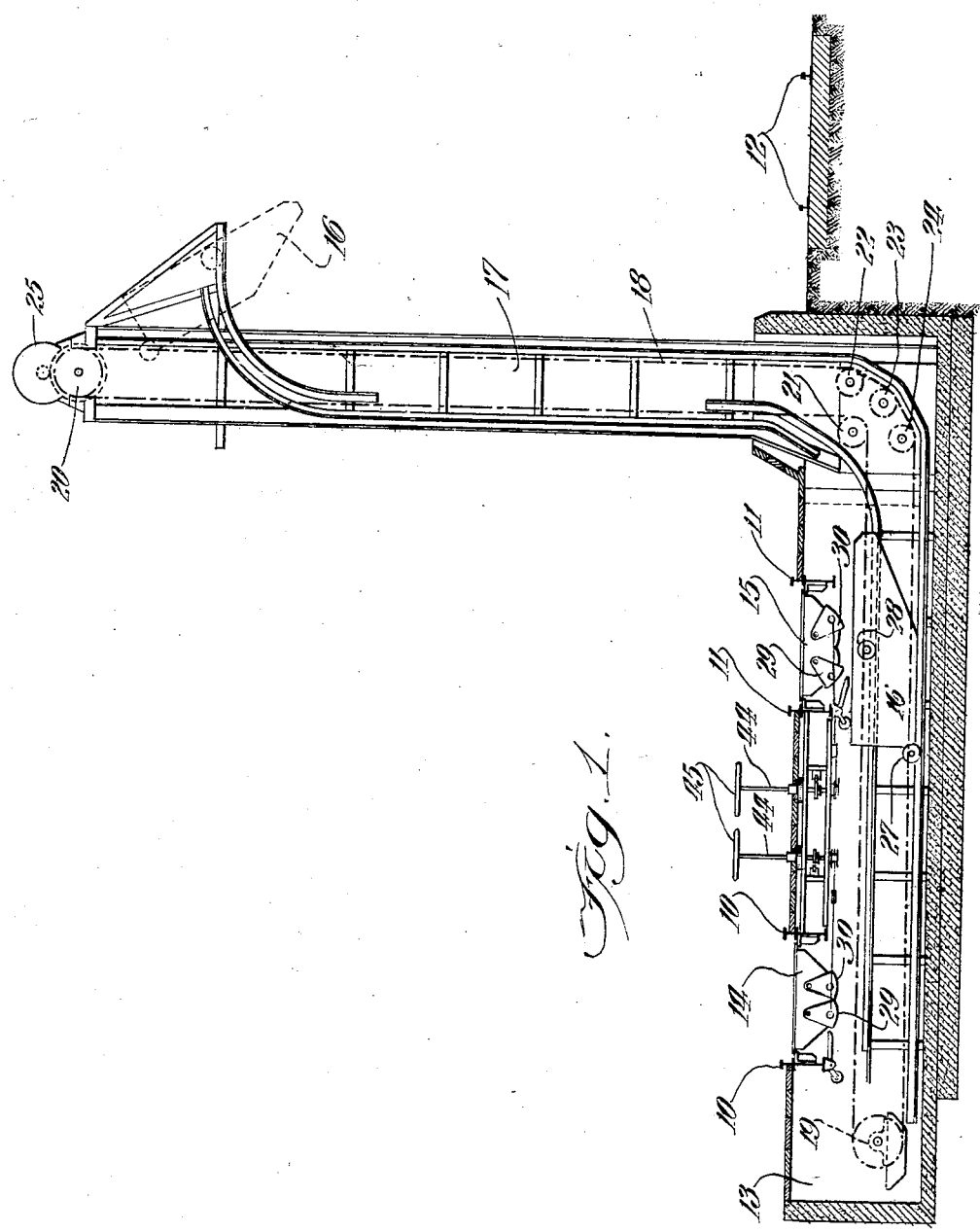
Inventor:
Barton S. Snow,
by Dyrenforth, Lee, Chritton & Wiles,
Attys

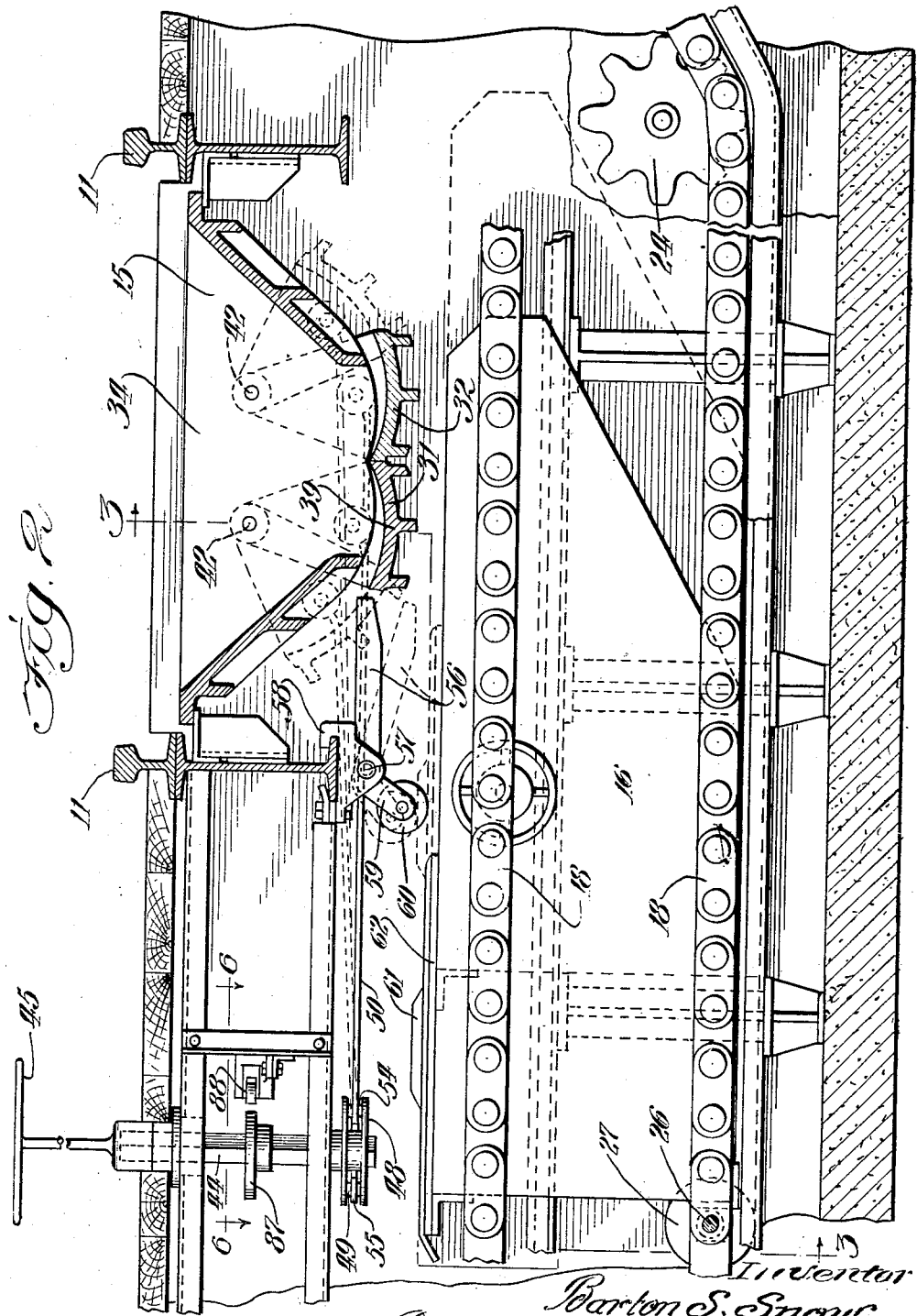

Dec. 10, 1929.  B. S. SNOW  1,739,099
MATERIAL MOVING APPARATUS
Filed Nov. 1, 1926  5 Sheets-Sheet 3
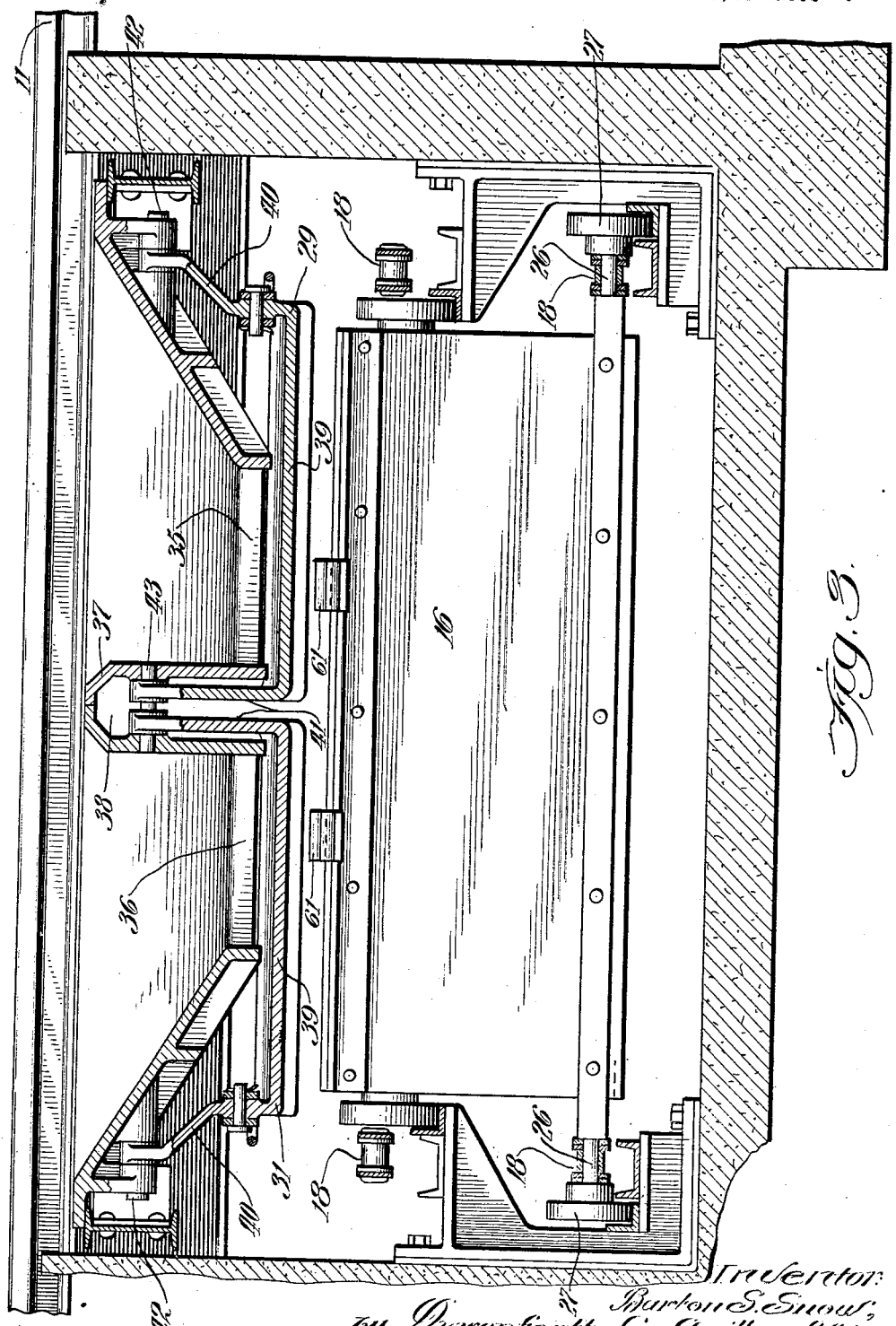

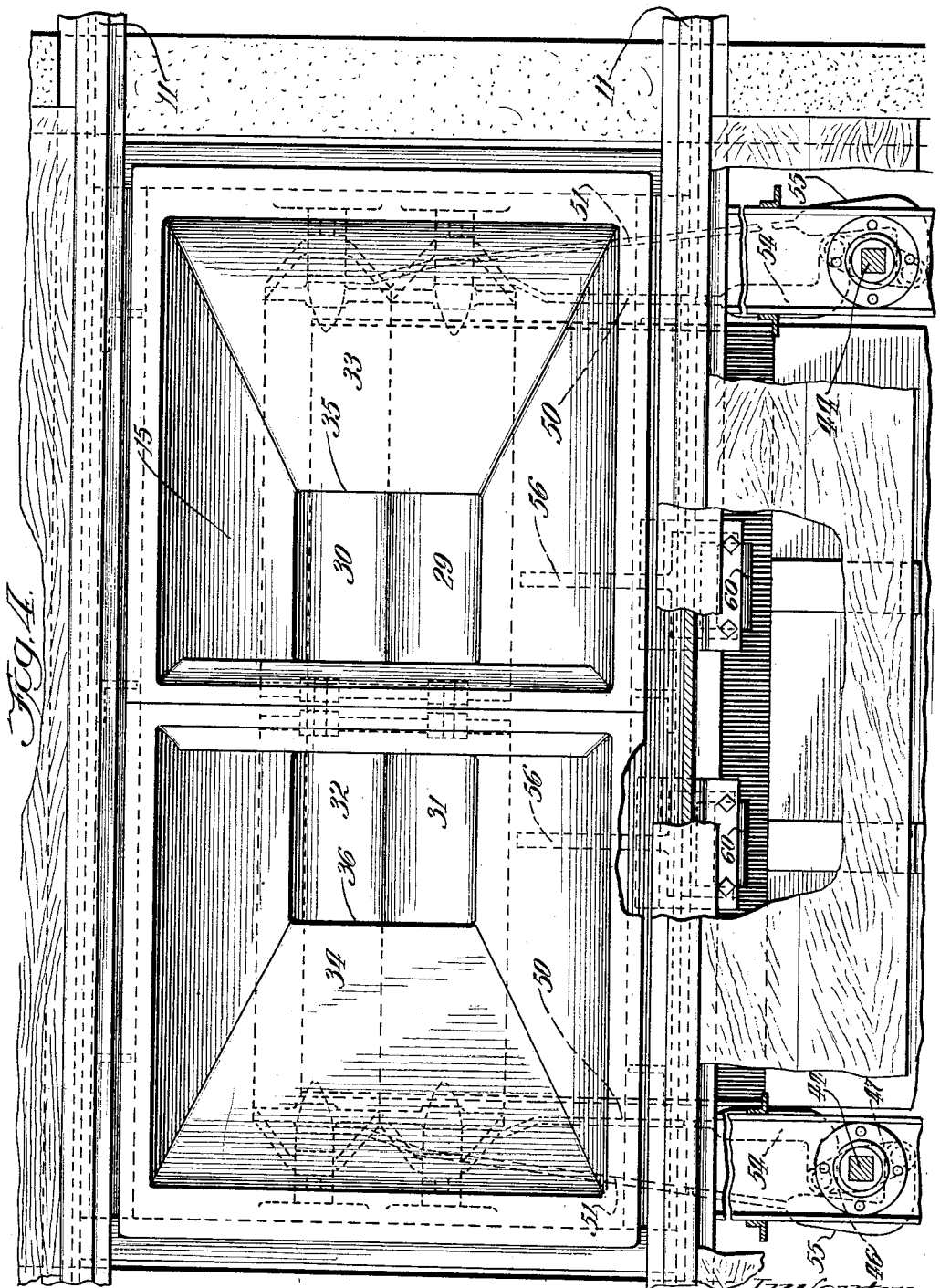

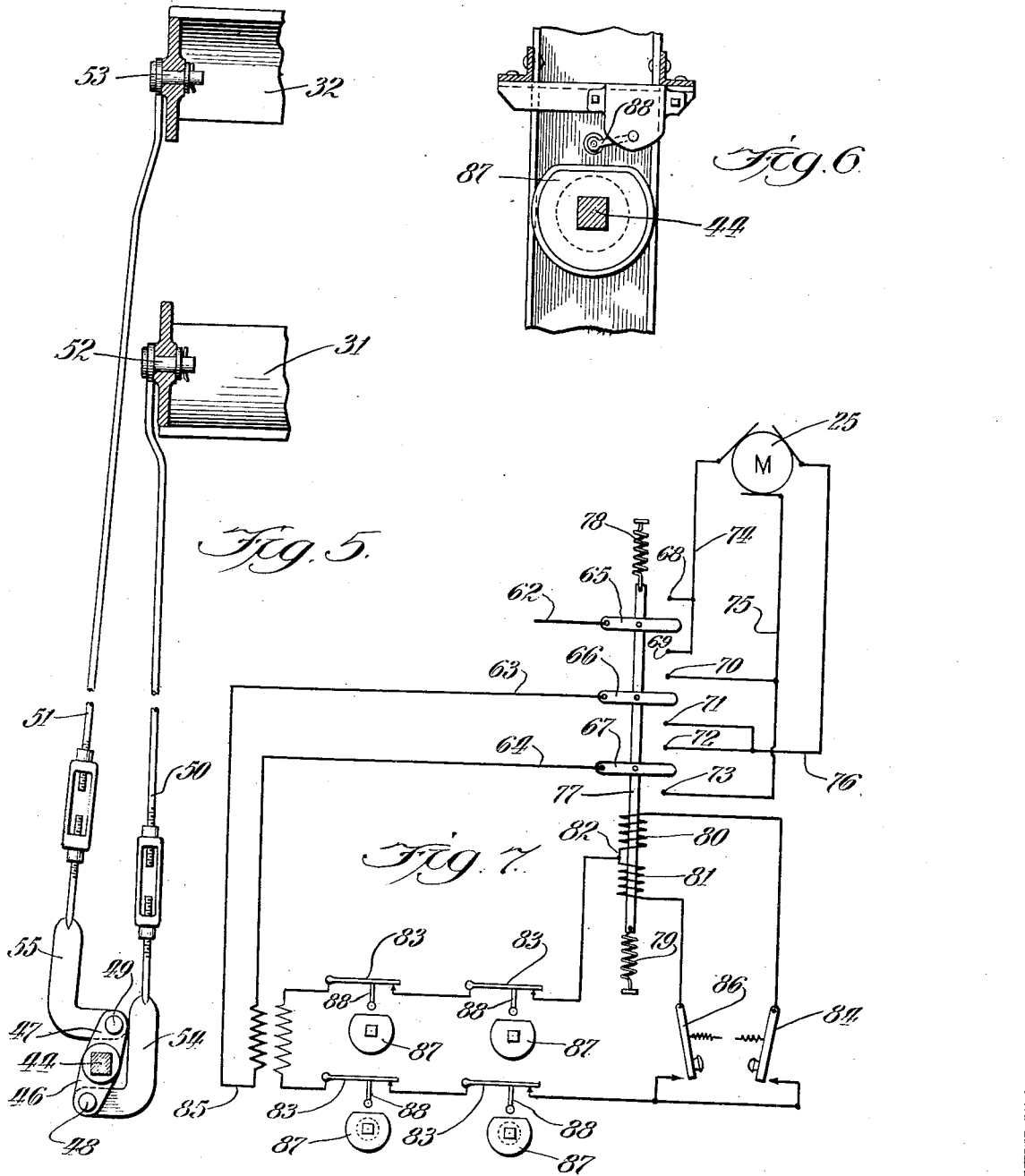

Patented Dec. 10, 1929

1,739,099

UNITED STATES PATENT OFFICE

BARTON S. SNOW, OF WHEATON, ILLINOIS, ASSIGNOR TO T. W. SNOW CONSTRUCTION COMPANY, OF CHICAGO, ILLINOIS, A CORPORATION OF ILLINOIS

MATERIAL-MOVING APPARATUS

Application filed November 1, 1926. Serial No. 145,517.

My invention relates to material-moving apparatus, in general, but more particularly to apparatus in which the material to be moved is positioned in a hopper the outlet of which is valve-controlled; the material being dischargeable therefrom, under control, to material-moving means, as for example a movable receptacle, for transferring the material to another location, as for example from a hopper located below a railroad track and provided to receive cinders from a locomotive, to a point of discharge above a cinder-receiving car.

My primary objects are to provide improvements in apparatus of the general type stated, to the end that the discharge of the material from the material-supplying means, as for example the hopper referred to, cannot be effected unless the receptacle, or other receiving element of the material-moving means, is in such position that the material will discharge therein, thereby preventing the dumping of the material upon the floor of the space in which the material-moving means operate; to provide means, in apparatus employing a power device for actuating the material-moving means, for preventing the movement of the material-receiving means from a position in which it receives the material, so long as the material-supplying means (the hopper) is conditioned for discharging material therefrom; to provide in a hopper structure involving a plurality of gates controlling the outlet thereof, for the releasable locking of the gates in both the open and closed positions; and other objects as will be manifest from the following description.

As a preface to the following description, it may be stated that I have devised my improvements for embodiment, more particularly, in so-called cindering apparatus designed to receive, and dispose of, the cinders discharged from locomotives during the cleaning out of the fire-boxes thereof, and thereafter elevate the cinders to a point of discharge above a track upon which the cinder-receiving car runs, the apparatus being designed to provide for the removal of cinders discharged from locomotives on two parallel tracks, by the use of a single cinder-conveying receptacle and hoist.

Referring to the accompanying drawings:—

Figure 1 is a view in sectional elevation of a plant of the character stated and embodying my improvements. Figure 2 is an enlarged, broken, detailed view of the right-hand hopper in Fig. 1 and the portions of the apparatus adjacent thereto, this view showing the parts in elevation with certain parts thereof sectioned, the gates being shown by full lines in closed position and by dotted lines in open position. Figure 3 is a section taken at the irregular line 3—3 on Fig. 2 and viewed in the direction of the arrows. Figure 4 is a broken plan view of the structure shown in Fig. 2, with certain parts broken away and sectioned to disclose details thereof. Figure 5 is a plan sectional view of one of the plurality of mechanism by means of which the gates of the hoppers are moved into and out of open position. Figure 6 is a broken sectional view of a detail of the mechanism controlling the movement of the bucket into which the material in the hoppers is dumped; and Figure 7, a diagram of a circuit controlling the motor by the operation of which the bucket is operated.

In the particular arrangement shown a pair of railway tracks for receiving the locomotives to be discharged of their cinders, are represented at 10 and 11 and a track upon which the cinder-receiving car is to run, at 12. Extending below the tracks 10 and 11 is a pit 13 which extends to a point between the tracks 11 and 12. Located in the space between the rails forming the tracks 10 and 11, and positioned in the upper part of the pit 13, are hoppers 14 and 15 into which the cinders discharged from the locomotives positioned thereover dump, the bottoms of these hoppers being open at provide discharge-outlets controlled by gates as hereinafter described. The receptacle for receiving the cinders from the hoppers 14 and 15, and shown in the form of a bucket, is represented at 16, its upper side being open part way from the right-hand end thereof in Fig. 1, to receive therethrough the cinders from the hoppers. The bucket 16 is movable, under control, in a direction crosswise of the tracks 10 and 11, and upwardly along a tower portion 17 to a point of discharge as represented by the dotted, dumping, position of the bucket in Fig. 1 in which position the material elevated by the bucket discharges into a cinder car (not shown) positioned on the track 12. The bucket; the guideways, or tracks, along which the bucket moves beneath the hoppers and up and down at the tower portion 17 to the point of discharge; and the connections between the bucket and the driving means therefor, are shown of the same general construction as in the case of structures as hitherto provided and well known in the art, and detailed description thereof does not, therefore, appear to be necessary. Suffice it to say that the bucket 16 is operated along the path described by means of an endless flexible element, such as the endless sprocket chain 18 which passes over terminal sprockets 19 and 20 located at the end of the pit 13 and adjacent the top of the tower 17, respectively, and engages intermediate sprockets 21, 22, 23 and 24 for causing the chain to move through horizontal and upright paths, the chain 18 being driven by a power device 25 as for example a reversible electric motor, the bucket 16 being connected with the chain 18, as for example at the shaft 26 upon which one pair of the track-engaging wheels 27 at opposite sides of the bucket 16 are journalled, the other wheels of the bucket being represented at 28, and the shaft 26 forming the pivotal connection between adjacent ones of the links of the chain 18.

The gate mechanisms hereinbefore referred to, for the hoppers 14 and 15 are of the same construction, each comprising four gate sections 29, 30, 31 and 32. In the construction shown each hopper 14 and 15 is formed of two compartments 33 and 34 having lower discharge openings 35 and 36 with the wall therebetween, and represented at 37, hollow to provide a space 38, the gate sections 29 and 30 controlling the opening 35 and the gate sections 31 and 32 controlling the opening 36. The gate sections referred to are formed of bottom plate portions 39 of arc-shape and end plates 40 and 41 at which these gates are journalled on shafts 42 and 43 carried by a stationary part of the hopper, each of the discharge openings in each hopper being controlled by a pair of these gate sections which in hopper-closing position occupy the position shown by full lines in Fig. 2, and in hopper opening position occupy the dotted-line position shown in this figure.

The members of each pair of gate sections are shown as simultaneously operable to hopper-opening and closing position, by means comprising a vertically-extending rotatable shaft 44 journalled in the roof of the pit 13 and shown as provided at its upper end with a hand wheel 45 by which it may be manually rotated. The lower end of each shaft 44 has rigidly secured thereto arms 46 and 47 which extend in diametrically opposite directions, these arms being provided with cross pins 48 and 49, respectively, which in effect form cranks to which links 50 and 51, at ends thereof, are respectively pivotally connected, the other ends of these links being pivotally connected respectively, with the members of the pair of gate sections, with which they cooperate, as represented at 52 and 53, respectively. The links 50 and 51 at the portions thereof at which they connect with the arms 46 and 47 are in the form of angle members 54 and 55 the angularly extending ends of which extend in opposite directions. The arrangement is such, as shown, that when the shaft 44 is rotated to a position in which the gate sections controlled thereby are moved away from each other to open the hopper-outlet, the parts will occupy the position shown in Fig. 5 in which position the pivoting crank-pin 49 passes over center and thus the gate sections are held in open condition against accidental movement, as by jarring, to closed position; and when the shaft 44 is reversely rotated to move these gate sections toward each other to closed position, the pivoting crank-pin 48 will pass beyond center, as shown by dotted lines in Fig. 4, and hold the gate sections against accidental separation.

Means are provided for normally locking all of the gates in closed position and permitting of the opening of any one thereof only when the bucket 16 is in a position to receive the material from the hopper controlled by this gate, these means, in the particular embodiment shown comprising a rocking abutment lever for each pair of gate sections, each of these levers represented at 56, is pivotally mounted on a shaft 57 secured in a clip 58 rigidly attached to a stationary part of the structure and so disposed and weighted as to normally occupy the position relative to one of the members of the pair of gate sections with which it cooperates, as shown by full lines in Fig. 2, in which position it forms a stop, or lock, preventing the gate sections controlled thereby from being swung outwardly to open position. The levers 56 are so shaped, as shown, that when they extend in the gate-locking position referred to their depending lug portions 59 incline downwardly in a direction away from their abutment-forming end-portions, as shown, the lower ends of these inclined portions being equipped with rollers 60 which extend into the path of movement of plates 61 extending upwardly from the stationary side-closing plate 62 of the bucket 16, so that the levers 59 are caused to be rocked out of gate-obstructing position upon the engagement of the plate 61 with the rollers 60 in the movement of the bucket 16 in either direction. The position to which the levers 59 are moved in the operation stated, is represented by dotted lines in Fig. 2, and these levers are held in such position, against their tendency to return to locking position, only so long as the plate 61 is engaged with the rollers 60. Thus it will be understood that the operator may not open the gates of either hopper until, and unless, the bucket 16 has been moved into a position in registration with the hopper from which the material is to discharge, and then only those gates of the hopper adjacent to which the bucket extends, thus preventing the operator from accidentally dumping the contents of either hopper into the pit.

Means are also provided for preventing the supplying of power to the bucket-operating mechanism for moving the bucket, during the discharge of material from either hopper into the bucket, these means in the particular construction illustrated comprising generally stated, electric-switches in the circuit controlling the motor 25, these switches being normally closed, and means whereby operation of the mechanism for moving any pair of the gate sections to open condition, automatically opens one of the switches referred to and prevents the starting up of the motor 25.

As a preface to a more detailed description of the means controlling the operation of the motor 25 it may be stated that in apparatus of the general character above referred to it is common to provide a series of push buttons the operation of which automatically moves the bucket to different selected predetermined positions, my invention having utility not only in an apparatus of the character just stated, but also in apparatus involving other controls for the motor, as for example one wherein switch controls are provided for driving the motor in one direction, or the other, selectively, are provided; and to simplify the showing in the drawings I have shown (Fig. 7) a circuit arrangement involving this last mentioned type of control for the motor 25. In this arrangement the three line wires, represented at 62, 63 and 64, are connected with switch-arms 65, 66 and 67, respectively, of switches having the controls 68 to 73, inclusive one pair for cooperation with each switch-arm. The contacts 68 and 69 connect, by a wire 74, with one of the binding posts of the motor 25; the contacts 70 and 73 connect, by a wire 75, with another of the binding posts of the motor; and the contacts 71 and 72 connect, by a wire 76, with the third binding post of the motor. The switch-arms 65, 66 and 67 are simultaneously operated in the same direction by a solenoid, the core 77 of which operatively engages these switch-arms and is yieldingly held, by springs 78 and 79, in a position in which all of the switch arms 65, 66 and 67 are out of contact with their cooperating contacts 68 to 73, inclusive. The solenoid referred to is formed with two windings 80 and 81 connected together at 82, with the parts so arranged that when the winding 80 is energized the core 77 shifts in a direction to move the switch arms 65, 66 and 67 into engagement, respectively, with the contacts 68, 70 and 72, thereby causing the motor 25 to rotate in one direction; and when the winding 81 is energized the core shifts in the opposite direction and moves these switch arms into engagement, respectively, with the contacts 69, 71 and 73 thereby causing the motor 25 to rotate in the opposite direction all as well understood in the art.

The winding 80 of the solenoid is interposed, together with the four switches controlled by the four shafts 44, and represented at 83 and a manually-controlled self-opening switch 84, in an electrical circuit shown as supplied with current from a transformer 85 supplied with current from the main line wires 63 and 64; and the winding 81 is interposed together with the switches 83 and a manually-controlled self-opening switch 86, in an electrical circuit supplied with current from the transformer 85. Thus by closing switch 84 the motor 25 is rotated in one direction and by opening switch 84 and closing switch 86 the motor is reversely operated, assuming that all of the switches 83 are closed, in which condition all of the gates for the hoppers are closed. The operator may thus cause the bucket 16 to be moved to any position desired so long as none of the gates are open.

The switches 83 are controlled by the shafts 44 to automatically open the circuits in which the solenoid-windings 80 and 81 are interposed, upon actuating any one of the shafts 44 to gate-opening position, by means of mutilated disks 87 rigidly secured to the shafts 44. These disks are so positioned that when the gates are closed the mutilated portions of the disk oppose levers 88 but are out of contact therewith, these levers when engaged by the unmutilated portions of the disks 87 being operated to a position in which the switches 83 controlled thereby, and which latter are of the self-closing type, are forced out of closed position. Thus as soon as the operator moves any one of the shafts 44 to open any one of the gates, the circuit through the solenoid-windings 80 and 81 will be automatically opened and thus manipulation, by the operator, of either switch 84 or 86, will have no effect on the motor 25, the bucket 16 remaining in the position occupied by it at the time the switch 83 is opened, viz, under one of the hoppers, until all of the switches 83 are in closed position, whereupon the operator by manipulating the switches 84 or 86 may shift the bucket 16 as desired, for example to move it to discharging position shown by dotted lines in Fig. 1.

It will be understood from the foregoing that it is thus impossible for the operator to open the gates of a hopper until the bucket 16 is beneath it, and impossible to move the bucket from this position until these gates have been closed, thereby ensuring against the discharging of material into the pit.

While I have illustrated and described a particular construction embodying my invention I do not wish to be understood as intending to limit it thereto as the same may be variously modified and altered without departing from the spirit of my invention.

What I claim as new, and desire to secure by Letters Patent, is:

1. In material-moving apparatus, the combination of material-moving means, means for supplying material thereto and comprising a controlling element and manually-controlled means by which said element is actuated, and releasable means controlled by said material-moving means for preventing the operation of said element by said manually-controlled means to supply material from said second-named means, unless said first-named means is in position to receive the material.

2. In material-moving apparatus, the combination of material-moving means and comprising a material-moving element, means for supplying material thereto and comprising a controlling element, and releasable means controlled by said material-moving means for preventing operation of said controlling element to supply material from said second-named means, unless said first-named means is in position to receive the material, comprising a releasable locking member preventing the operation of said controlling element to supply material from said second-named means, movable by said material-moving element to releasing position upon the movement of the latter into a position to receive material.

3. In material-moving apparatus, the combination of material-moving means and comprising a material-moving element, means for supplying material thereto and comprising a controlling element and manually-controlled means by which said element is actuated, and releasable means controlled by said material-moving means for preventing operation of said controlling element to supply material from said second-named means, unless said first-named means is in position to receive the material, comprising a releasable member preventing the operation of said controlling element by said manually-controlled means to supply material from said second-named means, movable by said material-moving means to releasing position upon the movement of said material-moving element into a position to receive material.

4. In material-moving apparatus, the combination of material-moving means, a plurality of means for supplying material thereto and comprising selectively operated controlling elements, and means controlled by said material-moving means and controlling the operation of said controlling elements and operative to render said controlling elements inoperative unless said first-named means is in position to receive the material.

5. In material-moving apparatus, the combination of power operated, material-moving means, means for supplying material thereto comprising a manually controlled actuating element, and means controlled by said element for preventing supplying of power to said first-named means for moving the latter while material is being supplied thereto by said second-named means.

6. In material-moving apparatus, the combination of a hopper having an outlet, means controlling said outlet and comprising an actuating element, material-conveying means movable into and out of a position for receiving material from said hopper, and abutting means for locking said first-named means against movement to feeding position by said actuating element, said abutting means being operable to released condition by said material-conveying means to permit subsequent movement of said first-named means to open position by force applied to said actuating element.

7. In material-moving apparatus, the combination of a hopper having an outlet, means controlling said outlet and comprising an actuating element, material-conveying means movable into and out of position for receiving material from said hopper, and a shiftable locking member for locking said first-named means against movement to feeding position by said actuating element, said locking member being operable to released condition by said material-conveying means to permit subsequent movement of said first-named means to open position by force applied to said actuating element.

8. In material-moving apparatus, the combination of manually-controlled, power-operated, material-moving means, manually-controlled means for supplying material thereto, means for preventing the supplying of motive power to said first named means when said material moving means is in position to receive material, and means to condition said preventing means for operation by the movement of said material-supplying means to material-supplying position under said manual control.

9. In material-moving apparatus, the combination of manually-controlled, electrically-operated, material-moving means, manually-controlled means for supplying material thereto, means for preventing the supplying of electric power to said first named means when in material-receiving position, and means to condition said preventing means for operation by the movement of said material-supplying means to material-supplying position under said manual control.

10. In material-moving apparatus, the combination of manually-controlled, power-operated, material-moving means, manually-controlled means for supplying material thereto, means for preventing the supplying of material by said second named means when said first named means is out of material-receiving position, means for preventing the supplying of motive power to said first named means to move the same when in material-receiving position and means to condition said last named means for operation by the movement of said material-supplying means to material-supplying position under said manual control.

11. In material-moving apparatus, the combination of manually-controlled, power-operated, material-moving means, manually-controlled means for supplying material thereto, means controlled by said material-moving means for preventing the supplying of material by said second named means when said first named means is out of material-receiving position, means for preventing the supplying of motive power to said first named means to move the same when in material-receiving position and means to condition said last named means for operation by the movement of said material-supplying means to material-supplying position under said manual control.

12. In material-moving apparatus, the combination of a hopper having an outlet, means controlling said outlet and comprising an actuating element, manually-controlled, material-moving means movable into and out of a position for receiving material from said hopper, releasable means for locking said first-named means against movement to feeding position by said actuating element, said releasable means being operable to released condition by said material-conveying means to permit subsequent movement of said first-named means to open position by force applied to said actuating element, and means for preventing the operation of said material-conveying means while material is being supplied thereto from said hopper.

13. In material-moving apparatus, the combination of manually-controlled material-moving means, a plurality of means for supplying material thereto and comprising selectively operated controlling elements, means controlled by said material-moving means and controlling the operation of said controlling elements and operative to render said controlling elements inoperative unless said first-named means are in position to receive the material, and means for preventing the operation of said first-named means while material is being supplied thereto by either of said second-named means.

BARTON S. SNOW.